(12) United States Patent
Kimura (10) Patent No.: US 8,031,955 B2
(45) Date of Patent: Oct. 4, 2011

(54) IMAGE PROCESSING APPARATUS, IMAGE PROCESSING METHOD, MEDIUM STORING PROGRAM, AND COMPUTER DATA SIGNAL

(75) Inventor: Shunichi Kimura, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1064 days.

(21) Appl. No.: 11/594,064

(22) Filed: Nov. 8, 2006

(65) Prior Publication Data
US 2007/0230808 A1  Oct. 4, 2007

(30) Foreign Application Priority Data
Apr. 3, 2006  (JP) ................................. 2006-102237

(51) Int. Cl.
G06K 9/36 (2006.01)
G06K 9/46 (2006.01)
G06K 9/66 (2006.01)
G06K 9/68 (2006.01)

(52) U.S. Cl. ......... 382/240; 382/195; 382/219; 382/276

(58) Field of Classification Search .................. 382/240, 382/248, 281, 282
See application file for complete search history.

(56) References Cited

U.S. PATENT DOCUMENTS

| | | | | |
|---|---|---|---|---|
| 5,060,285 A | * | 10/1991 | Dixit et al. | 382/253 |
| 5,241,395 A | * | 8/1993 | Chen | 358/426.14 |
| 5,768,434 A | * | 6/1998 | Ran | 382/240 |
| 5,831,677 A | * | 11/1998 | Streater | 375/240.12 |
| 6,195,128 B1 | * | 2/2001 | Streater | 375/240.12 |
| 6,320,981 B1 | * | 11/2001 | Yada | 382/168 |
| 7,356,182 B1 | * | 4/2008 | Fleisher et al. | 382/171 |
| 2002/0076101 A1 | * | 6/2002 | Wood et al. | 382/166 |
| 2005/0008250 A1 | * | 1/2005 | Lim et al. | 382/266 |
| 2005/0129125 A1 | * | 6/2005 | Cha et al. | 375/240.16 |
| 2006/0062301 A1 | * | 3/2006 | Sung | 375/240.13 |
| 2006/0158703 A1 | * | 7/2006 | Kisilev et al. | 358/504 |

FOREIGN PATENT DOCUMENTS

| | | |
|---|---|---|
| JP | A-2000-184203 | 6/2000 |
| JP | A-2002-010084 | 1/2002 |
| JP | A 2004-186934 | 7/2004 |

OTHER PUBLICATIONS

Jun. 4, 2010 Office Action issued in Japanese Patent Application No. 2006-102237 (with translation).

* cited by examiner

*Primary Examiner* — Samir Ahmed
*Assistant Examiner* — Li Liu
(74) *Attorney, Agent, or Firm* — Oliff & Berridge, PLC (57) ABSTRACT

An image processing apparatus includes a block setting unit that sets a block having a fixed size to inputted image data; a determining unit that determines whether or not at least a part of an image region included in the block set by the block setting unit is filled with a single pixel value; a pixel value replacing unit that replaces at least a part of the image region included in the block by a single pixel value according to a result of the determination by the determining unit; and a hierarchical process controller that instructs the block setting unit to set a broader block including plural set blocks.

8 Claims, 7 Drawing Sheets

FIG.2

IMAGE PROCESSING APPARATUS 2

(A) 2×2 BLOCK

(B) (DIFFERENCE AB) = | A − B |

(C) (DIFFERENCE CD) = | C − D |

(D) (DIFFERENCE AC) = | A − C |

(E) (DIFFERENCE BD) = | B − D |

(F) (DIFFERENCE BC) = | B − C |

FIG.7

(A) (AVERAGE PIXEL VALUE) = (A+B+C+D)/4

(B) (AVERAGE PIXEL VALUE) = (A+B)/2

(C) (AVERAGE PIXEL VALUE1) = (A+B)/2
    (AVERAGE PIXEL VALUE2) = (C+D)/2

(D) (AVERAGE PIXEL VALUE) = (A+B+C)/3

(E) OUTPUT AS IT IS

US 8,031,955 B2

IMAGE PROCESSING APPARATUS, IMAGE PROCESSING METHOD, MEDIUM STORING PROGRAM, AND COMPUTER DATA SIGNAL

BACKGROUND

1. Technical Field

The present invention relates to an image processing apparatus for reducing an amount of gradation change of an image, an image processing method, a medium storing a program, a computer data signal.

2. Related Art

For example, a method is disclosed in which a filter process for enhancing the lossless compression rate is performed to image data as the pre-processing of the compression process, and the compression and expansion are carried out with a lossless compression system corresponding to this filter process.

SUMMARY

According to an aspect of the present invention, there is provided an image processing apparatus including a block setting unit that sets a block having a fixed size to inputted image data; a determining unit that determines whether or not at least a part of an image region included in the block set by the block setting unit is filled with a single pixel value; a pixel value replacing unit that replaces at least a part of the image region included in the block by a single pixel value according to a result of the determination by the determining unit; and a hierarchical process controller that instructs the block setting unit to set a broader block including plural set blocks.

BRIEF DESCRIPTION OF THE DRAWINGS

An exemplary embodiment of the present invention will be described in detail based on the following figures, wherein.

DETAILED DESCRIPTION

The background and outline of the invention will be firstly explained for assisting the understanding of the invention.

An amount of gradation change of an image may be reduced as a pre-process of a coding process, for example. When the amount of gradation change is reduced by filling an image region, in which pixel values are approximated, with a single pixel value, the coding efficiency is enhanced, whereby high compression rate can be realized.

Since the filling process described above is a lossy image process, it is necessary to be done, taking the balance with the deterioration in image quality into consideration. The method disclosed above is, for example, to fill a pixel group, which has the amount of gradation change within a fixed range, with a single pixel value. However, this method entails a problem of the deterioration in image quality being particularly noticeable, because a definite restriction condition cannot be provided to the size of the region having the same pixel value.

Further, when filling is made in the order of the raster scan with the amount of gradation change monitored, the parallel process is difficult, and hence, it is difficult to achieve high speed on software or hardware.

In view of this, an image processing apparatus 2 according to this exemplary embodiment limits the size of an image region (block) that is to be processed, and each block is simultaneously processed.

Figure 1:
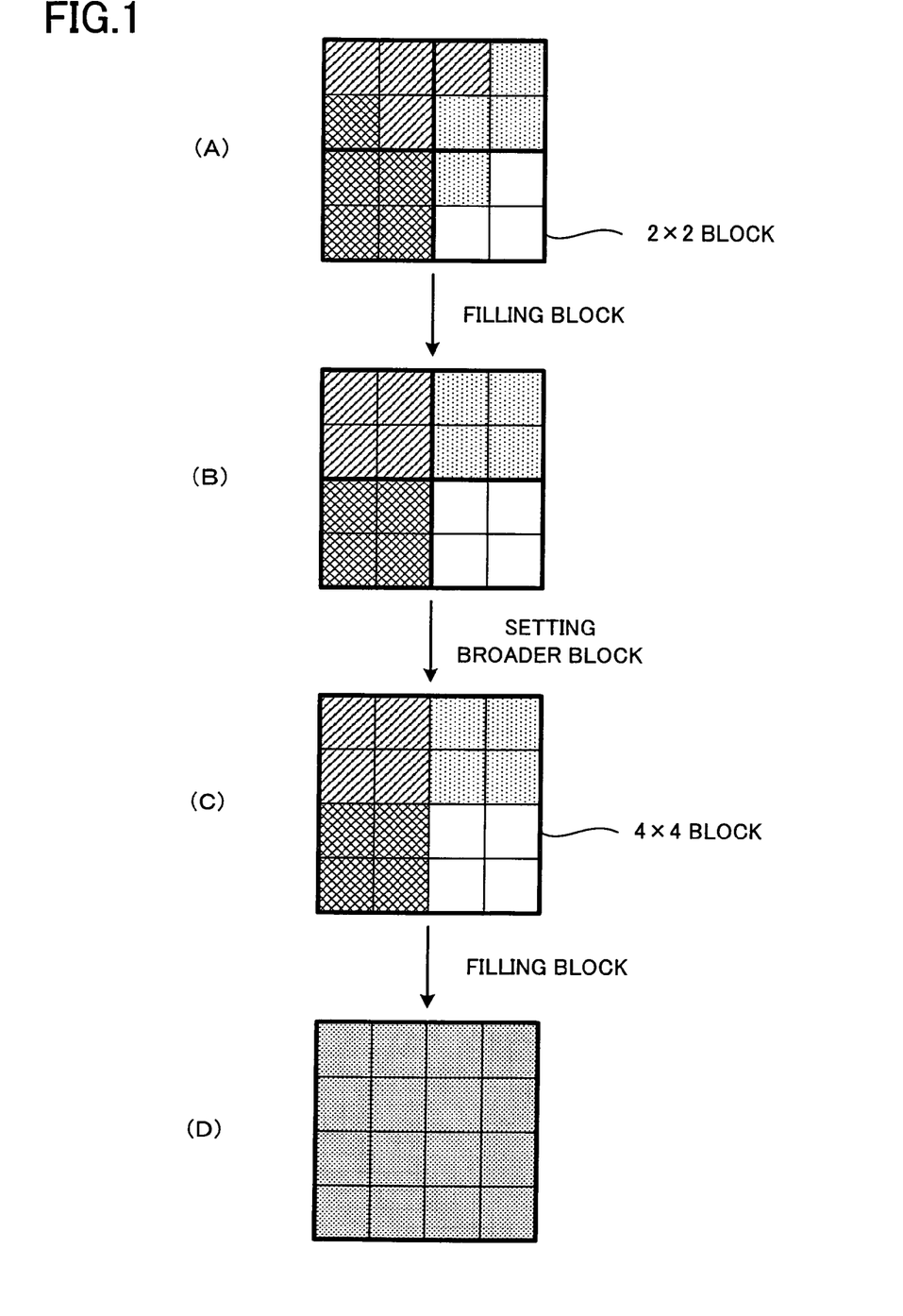
FIGS. 1(A), 1(B), 1(C) and 1(D) are diagrams for explaining an outline of the exemplary embodiment of the present invention.

More specifically, the image processing apparatus 2 of this exemplary embodiment sets, as illustrated in FIG. 1(A), a block having a fixed size (block of 2×2 in FIG. 1(A)). The image processing apparatus 2 evaluates the amount of gradation change in each block, and fills at least a part of the image region in each block with a single pixel value according to the result of the evaluation. The evaluation of the amount of gradation change is carried out in such a manner that the image region, such as an edge, in which the amount of gradation change is not less than a threshold value is designated as a no-filling region, and the image region in which the amount of gradation change is less than a threshold value is designated as the subject to be filled. In the example of FIG. 1(B), since the amount of gradation change in each block is less than the threshold value, the whole of each block is filled with a single pixel value (average pixel value, or the like).

When the blocks filled with the single pixel value are adjacent to each other, the present image processing apparatus 2 further sets, as illustrated in FIG. 1(C), a broader block (block of 4×4 in FIG. 1(C)) greater than these blocks. The image processing apparatus 2 evaluates the amount of gradation change for this broader block, and fills at least a part of the image region in the broader block according to the result of the evaluation.

As described above, the present image processing apparatus 2 performs the filling process successively from a small block, and performs the filling process gradually to a block having a greater size, wherein the image region whose amount of gradation change is relatively small is filled with a single pixel value, while protecting the edge portion where the amount of gradation change is great. Accordingly, the present image processing apparatus 2 enhances coding efficiency.

[Hardware]

Subsequently, a hardware configuration of the image processing apparatus 2 of the exemplary embodiment will be explained.

Figure 2:
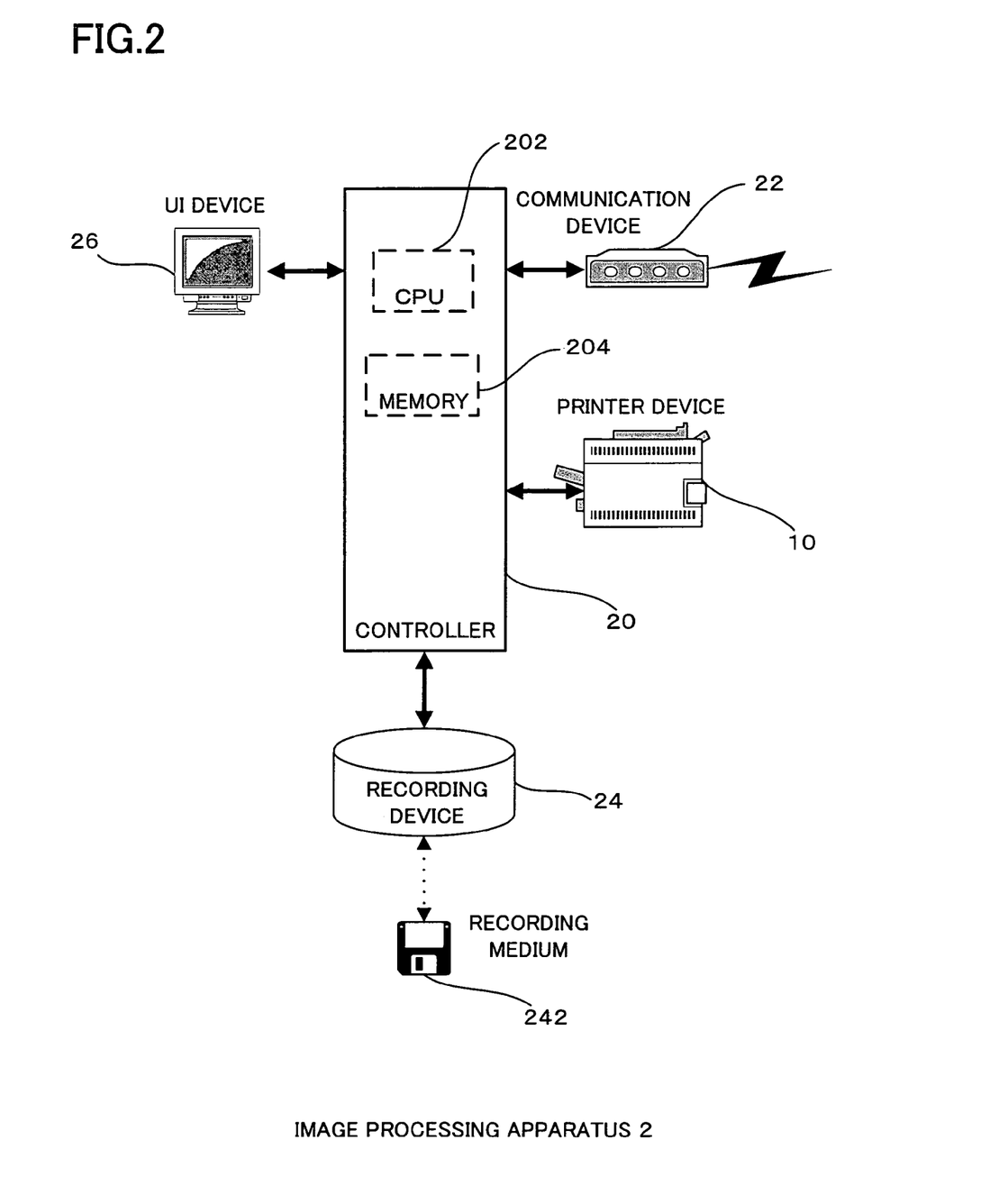
FIG. 2 is a diagram for illustrating a hardware configuration, mainly a controller 20, of an image processing apparatus 2 to which an image processing method according to an aspect of the present invention is applied.

FIG. 2 is a diagram illustrating a hardware configuration of the image processing apparatus 2, with focus on a controller 20, to which the image processing method according to an aspect of the present invention is applied.

As illustrated in FIG. 2, the image processing apparatus 2 is composed of a controller 20 including a CPU 202, a memory 204 and the like; a communication device 22; a recording device 24 such as HDD/CD device; and a user interface device (UI device) 26 including LCD display or CRT display and keyboard or touch panel.

The image processing apparatus 2 is provided in a printer device 10. It obtains image data through the communication device 22 or the recording device 24, and codes the obtained image data.

[Image Processing Program]

Figure 3:
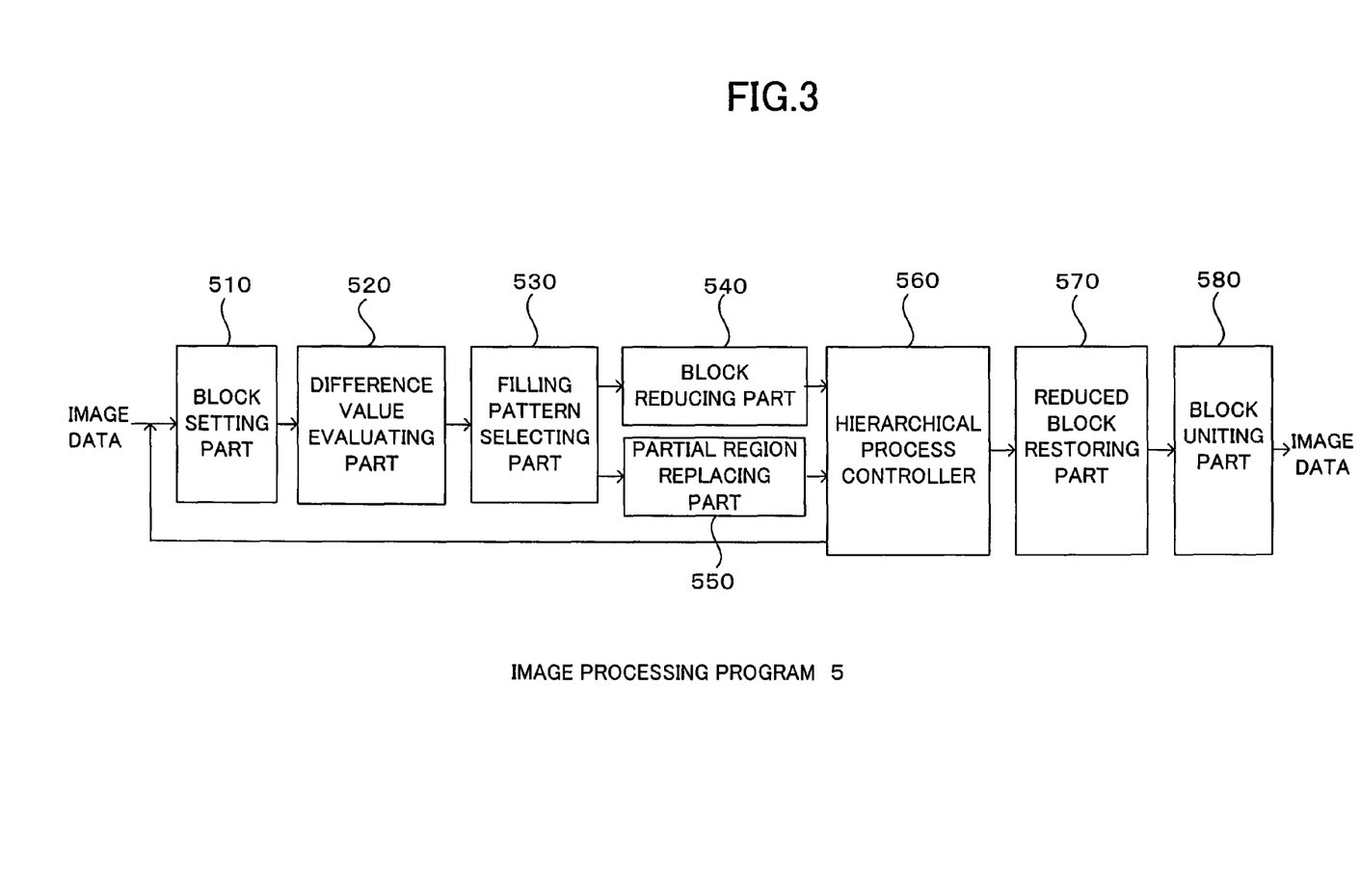
FIG. 3 is a diagram illustrating a functional configuration of the image processing program 5 executed by the controller 20 (FIG. 2)

FIG. 3 is a diagram illustrating a functional configuration of an image processing program 5 executed by the controller 20 (FIG. 2).

As illustrated in FIG. 3, the image processing program 5 has a block setting part 510, a difference value evaluating part 520, a filling pattern selecting part 530, a block reducing part 540, a partial region replacing part 550, a hierarchical process controller 560, a reduced block restoring part 570, and a block uniting part 580.

In the image processing program 5, the block setting part 510 sets a block (FIG. 1) having a fixed size to the inputted image data.

When blocks composed of a single pixel value are adjacent to each other, the block setting part 510 further sets a broader block including these blocks.

The block setting part 510 in this exemplary embodiment sets a block having a size of 2×2 to the inputted image data or to the image region reduced to $\frac{1}{2^n}$ (n is a natural number), whereby it successively sets a block having a size of 2×2, a block of 4×4, a block of 8×8, . . . a block of $2^n \times 2^n$, substantially.

The difference value evaluating part 520 evaluates the amount of gradation change in the block set by the block setting part 510.

The difference value evaluating part 520 in this exemplary embodiment calculates, for plural pixels included in the block, the difference value of the pixel value with plural combinations, and determines whether or not the calculated difference value is not less than a fixed threshold value.

The filling pattern selecting part 530 selects a filling pattern in each block on the basis of the result of the evaluation for each block by the difference value evaluating part 520. The filling pattern means a pattern indicating the image region that should be filled with a single pixel value.

Figure 7:
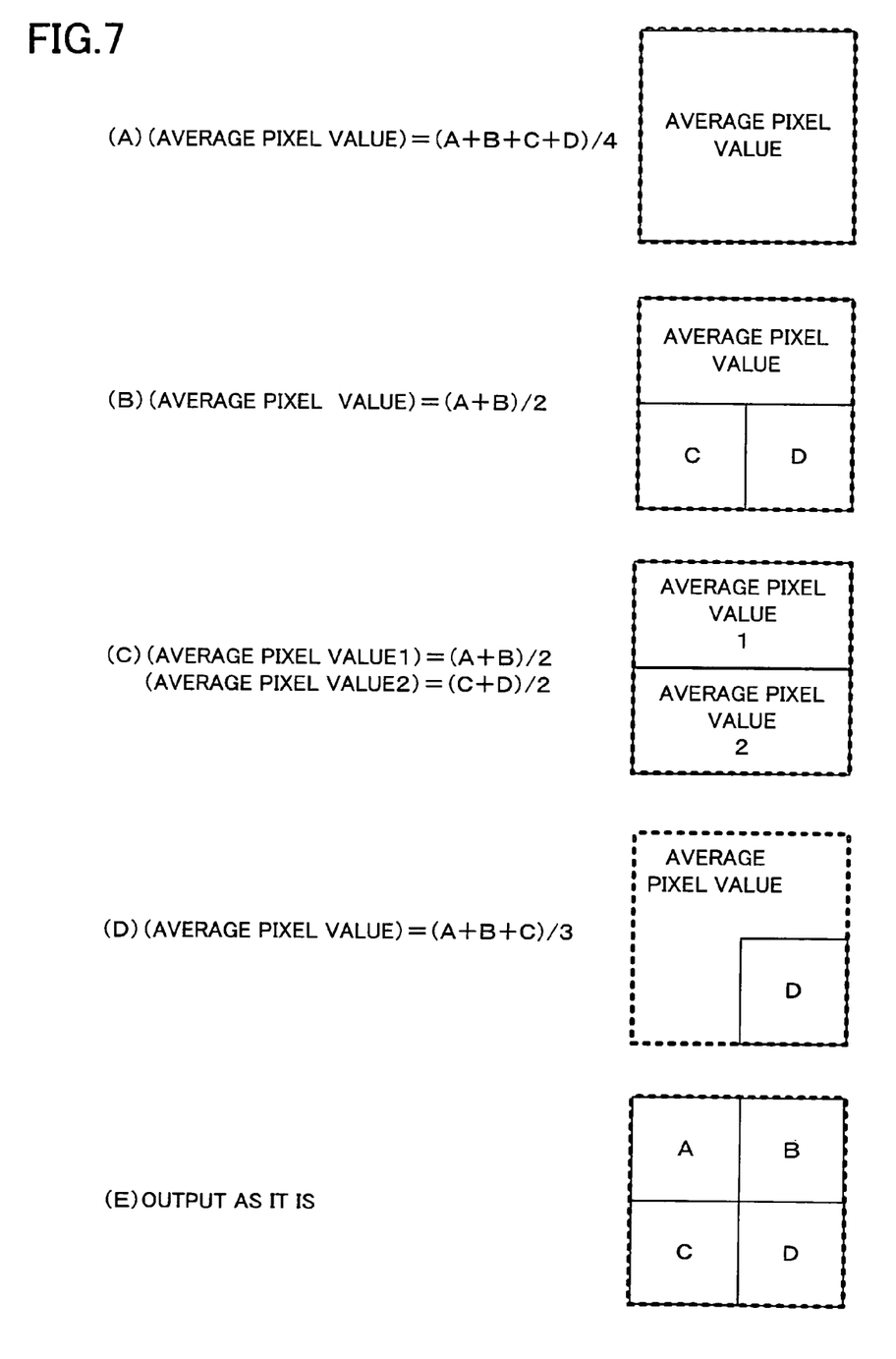
FIGS. 7(A), 7(B), 7(C), 7(D) and 7(E) are diagrams illustrating a filling pattern selected by a filling pattern selecting part 530.

The filling pattern selecting part 530 in this exemplary embodiment selects the filling pattern in accordance with the combination of whether the difference value is not less than the threshold value or not (described later with reference to FIG. 7).

When the pattern selecting part 530 selects the pattern for filling the whole image region in the block with a single pixel value, the block reducing part 540 reduces the image region in this block with the reduction ratio in accordance with the size of this block. The reduction ratio in accordance with the size of the block is, for example, a magnification for reducing the image region in the block to the image region corresponding to one pixel.

When the filling pattern in which the whole image region in this block is filled with a single pixel value is selected, the block reducing part 540 in this exemplary embodiment reduces the image region to ½ in the fast-scanning direction and slow-scanning direction by using the average pixel value in this block. Specifically, the block having a size of 2×2 is reduced to one pixel having the average pixel value of this block. As described above, the filling of the whole block and the reduction of the block are equivalent in this exemplary embodiment, and partial filling of the block and the reduction of the block may generically be referred to as the filling of block.

When the pattern selecting part 530 selects the pattern for filling a part of the image region in the block with a single pixel value, the partial region replacing part 550 fills a part of the image region in this block with a single pixel value.

The partial region replacing part 550 in this exemplary embodiment calculates the average pixel value in the image region corresponding to the filling pattern in accordance with the filling pattern selected by the filling pattern selecting part 530, and replaces the pixel value of the image region corresponding to the filling pattern by the calculated average pixel value.

The hierarchical process controller 560 instructs the block setting part 510 to set the broader block including plural blocks set by the block setting part 510. Here, the broader block means a block obtained by uniting plural blocks. After being set, it is processed by the same manner as the normal block. Specifically, the size of the block is gradually increased, and the evaluation of the amount of gradation change and the filling in the block are reflexively executed to the block of each size.

For example, when blocks having the single pixel value are adjacent to each other, the hierarchical process controller 560 instructs the block setting part 510 to set the broader block including these blocks.

The hierarchical process controller 560 of this exemplary embodiment outputs to the block setting part 510 the block that is reduced to ½ by the block reducing part 540, thereby causing the block setting part 510 to set the block of 2×2 for the reduced block.

The hierarchical process controller 560 of this exemplary embodiment outputs to the reduced block restoring part 570 the block (reduced block) inputted from the block reducing part 540 or the block (partly filled block, or block not at all filled) inputted from the partial region replacing part 550 under the condition that the block reduction is made up to the fixed reduction number (hierarchical number) or under the condition that the block of 2×2 cannot be set with the reduced block.

The reduced block restoring part 570 restores the block reduced by the block reducing part 540 to the block of the original size. Specifically, the reduced block restoring part 570 expands the block reduced by the block reducing part 540 to the original size. During the process for expanding the block, the pixel value included in the block is copied as it is. Accordingly, the block after the expansion is the image region that is filled uniformly with the pixel value before the expansion.

The reduced block restoring part 570 in this exemplary embodiment generates the block of $2^L \times 2^L$ (L is a hierarchical number) by using the pixel value of the reduced block. Notably, the equation of L=(reduction number)+1 is established.

The block uniting part 580 unites the block in which a part of the image region is filled with a single pixel value by the partial region replacing part 550, the block expanded by the reduced block restoring part 570, and the block that is not filled with a single pixel value, to thereby produce image data. The produced image data is coded by, for example, a predictive coding system. Since the image region in which the same pixel values are contiguous is increased in this exemplary embodiment, the hitting ratio of the predicting process in the predictive coding process is enhanced, whereby a high compression rate can be realized.

[Overall Operation]

Subsequently, an overall operation of the image processing apparatus 2 (image processing program 5) will be explained.

Figure 4:
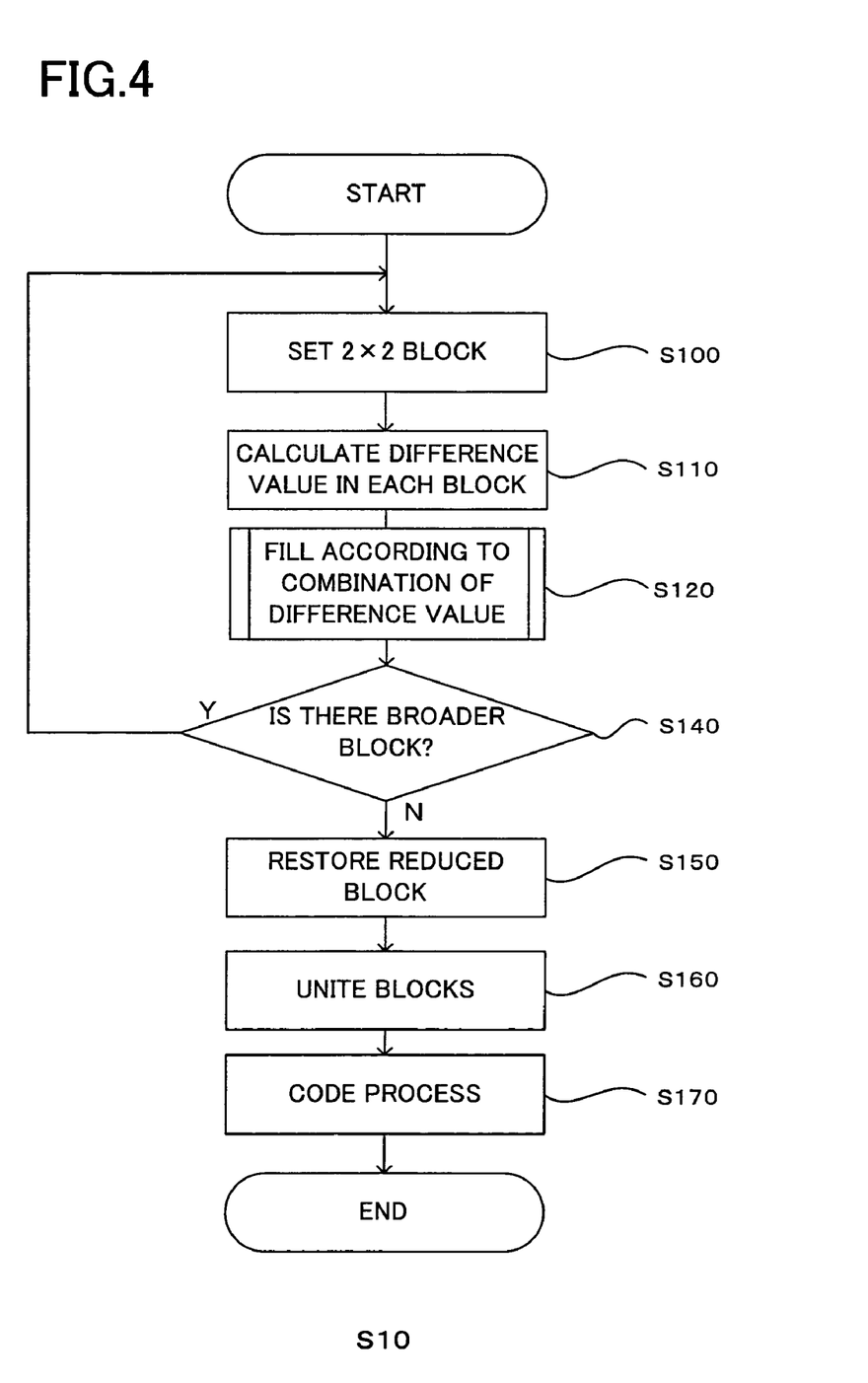
FIG. 4 is a flowchart of an image process (S10) in the image processing program 5 (FIG. 3)

FIG. 4 is a flowchart showing an image process (S10) in the image processing program 5 (FIG. 3).

Figure 6:
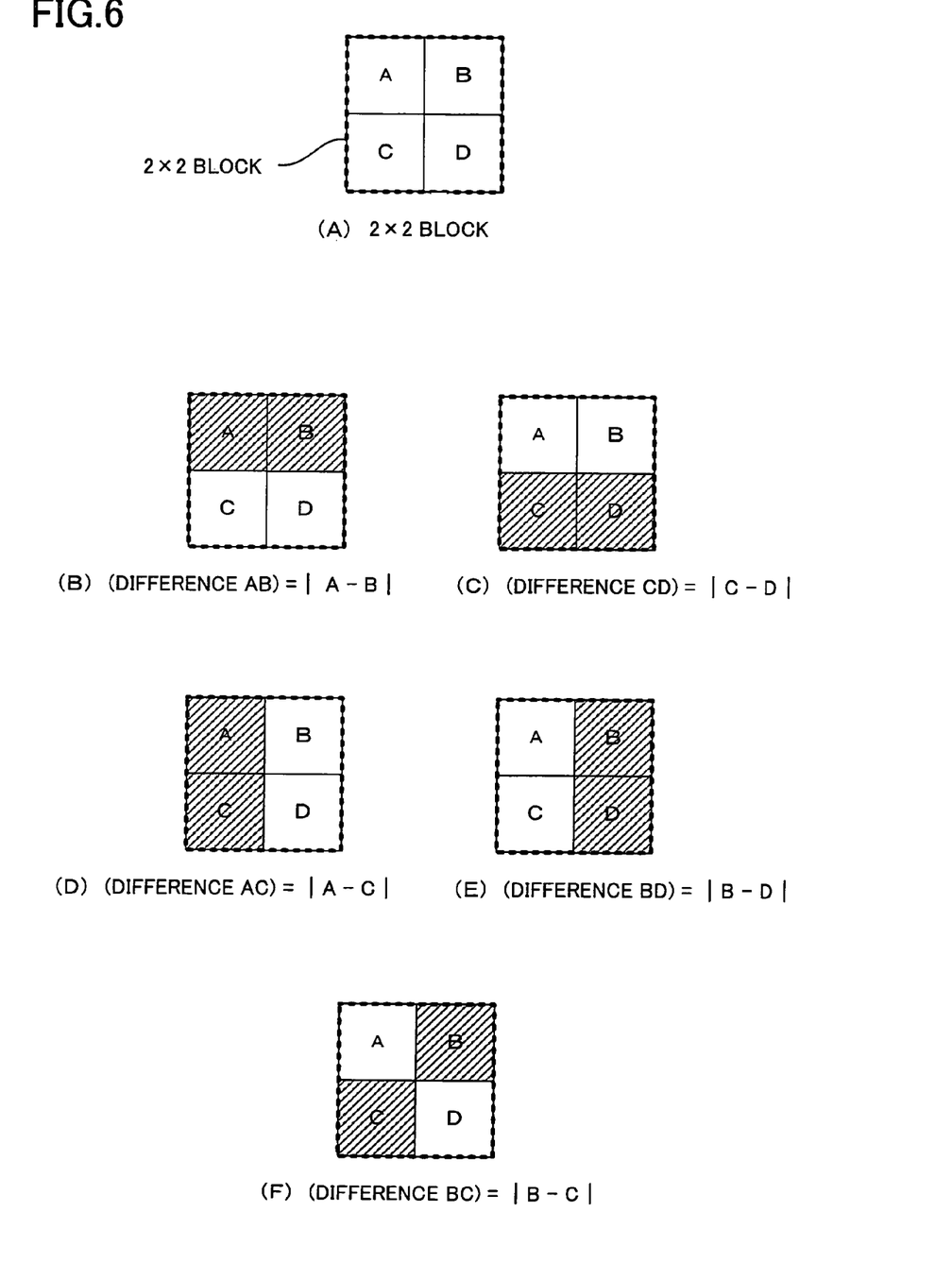
FIGS. 6(A), 6(B), 6(C), 6(D), 6(E) and 6(F) are diagrams for explaining a difference value calculated by a difference value evaluating part 520.

As shown in FIG. 4, the block setting part 510 (FIG. 3) divides the imputed image data into a block of 2×2 illustrated in FIG. 6(A) at step 100 (S100). A to D in the block illustrated in FIG. 6(A) indicate the pixel value of each pixel.

It is to be noted that the block setting part 510 sets the block (broader block) of 2×2 for the reduced block group when it performs a process at S100 subsequent to the process at S140.

The difference value evaluating part 520 calculates, at step 110 (S110), the difference value of the pixel value with four combinations illustrated in FIGS. 6(B) to 6(E) for each block of 2×2 set by the block setting part 510. The calculated difference values are the difference AB illustrated in FIG. 6(B), difference CD illustrated in FIG. 6(C), difference AC illustrated in FIG. 6(D), and difference BC illustrated in FIG. 6(E). It is to be noted that, in this exemplary embodiment, the processes from S110 to S150 are simultaneously executed for each block.

The difference value evaluating part 520 evaluates the difference value calculated for each block at step 120 (S120).

The filling pattern selecting part 530 selects the filling pattern applied to each block on the basis of the result of the evaluation for each block by the difference value evaluating part 520.

The block reducing part 540 and the partial region replacing part 550 execute the filling process (including the reducing process) for each block in accordance with the filling pattern selected for each block by the filling pattern selecting part 530.

The hierarchical process controller 560 determines at step 140 (S140) whether the process for the next hierarchy is executed or not. Whether the process for the next hierarchy is executed or not is determined by, for example, whether the processes from S100 to S120 are repeated or not to the fixed reduction number of times (hierarchical number L), or whether the block of 2×2 can be set or not with the reduced block.

When the block of 2×2 cannot be set with the reduced block (i.e., when the process for the next hierarchy is not executed), the image processing program 5 in this exemplary embodiment moves to the process at S150. On the other hand, when the block of 2×2 can be set with the reduced block (i.e., when the process for the next hierarchy is executed), the image processing program 5 returns to the process at S100, wherein the hierarchical process controller 560 instructs the block setting part 510 to set the broader block.

The hierarchical process controller 560 outputs, at step 150 (S150), each block (including reduced block and non-reduced block) to the reduced block restoring part 570.

The reduced block restoring part 570 expands the reduced block, among the blocks inputted from the hierarchical process controller 560, to the original size. The expanded block is filled with the pixel value before the expansion.

The reduced block restoring part 570 outputs the expanded block and non-reduced block to the block uniting part 580.

The block uniting part 580 unites the blocks inputted from the reduced block restoring part 570 to provide image data at step 160 (S160).

The coding section (not shown) codes the image data united by the block uniting part 580 with the Lempel-Ziv (LZ) coding system at step 170 (S170).

Figure 5:
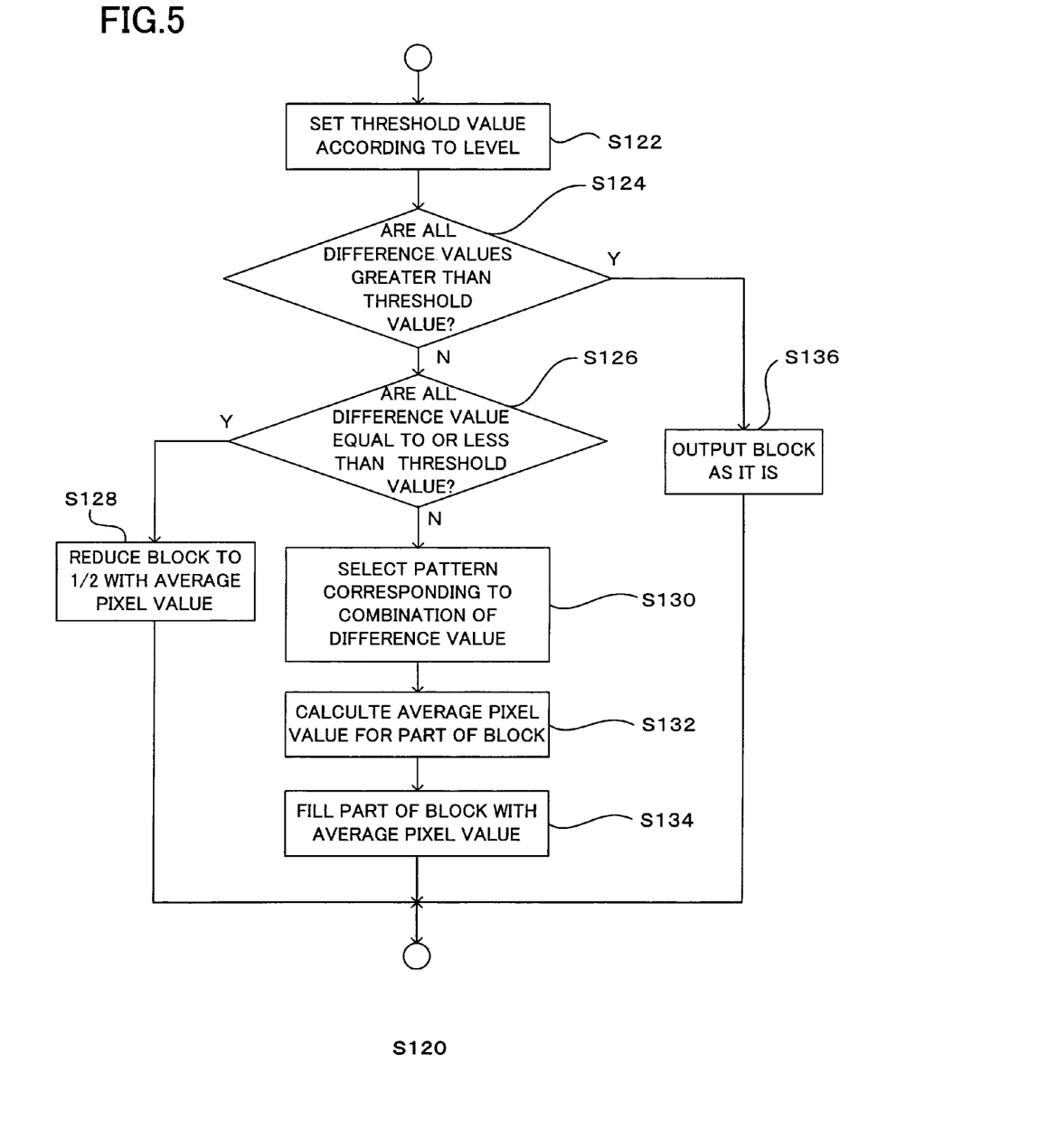
FIG. 5 is a flowchart for explaining the filling process (S120) in FIG. 4 in detail.

FIG. 5 is a flowchart for explaining the filling process (S120) in FIG. 4 in detail. Although the process for one block is explained with reference to this figure, the same process is simultaneously executed for the other blocks.

As shown in FIG. 5, the difference value evaluating part 520 (FIG. 3) sets the threshold value according to the hierarchical number L (level) at step 122 (S122). Although the same threshold value is set for all blocks belonging to the same hierarchy in this exemplary embodiment, a different threshold value may be set for every block or every combination for calculating the difference (i.e., each of combinations of FIG. 6(B) to 6(F)).

At step 124 (S124), the difference value evaluating part 520 compares the set threshold value with the each of the calculated difference values (i.e., the difference AB, difference CD, difference AC, and difference BC illustrated in FIG. 6(B) to 6(E)), and outputs the comparison result to the filling pattern selecting part 530.

When all of the difference values (the difference AB, difference CD, difference AC, and difference BC) are greater than the threshold value (i.e., when the amounts of gradation change in the fast-scanning direction and slow-scanning direction are great), the image processing program 5 moves to the process at S136, while in other cases, it moves to the process at S126.

When all of the difference values (the difference AB, difference CD, difference AC, and difference BC) are equal to or less than the threshold value (i.e., when the amounts of gradation change in the fast-scanning direction and slow-scanning direction are small) at step 126 (S126), the image processing program 5 moves to the process at S128, while in other cases, it moves to the process at S130.

When all of the difference values (the difference AB, difference CD, difference AC, and difference BC) are equal to or less than the threshold value, the filing pattern selecting part 530 selects the filling pattern illustrated at FIG. 7(A) at step 128 (S128). The filling pattern in FIG. 7(A) is to fill the whole image region in the block with a single pixel value (average pixel value).

When the filling pattern selecting part 530 selects the filling pattern shown in FIG. 7(A), it outputs this block to the block reducing part 540.

The block reducing part 540 calculates the average pixel value of the block inputted from the filling pattern selecting part 530 to designate one pixel having the calculated average pixel value as the reduced block. Specifically, the block reducing part 540 reduces the inputted block to ½ in the fast-scanning direction and slow-scanning direction, and outputs the reduced block to the hierarchical process controller 560.

At step 130 (S130), when there are the difference value greater than the threshold value and the difference value equal to or less than the threshold value in four difference values calculated for one block, the filling pattern selecting part 530 selects any one of the filling patterns illustrated in FIGS. 7(B) to 7(D) on the basis of the combinations in which the difference value is equal to or less than the threshold value.

When only the difference value AB (FIG. 6(B)) is equal to or less than the threshold value, for example, the filling pattern illustrated in FIG. 7(B) is selected. When only the difference value AB (FIG. 6(B)) and the difference value CD (FIG. 6(C)) are equal to or less than the threshold value, the filling pattern illustrated in FIG. 7(C) is selected.

When only the difference value AB (FIG. 6(B)) and the difference value AC (FIG. 6(D)) are equal to or less than the threshold value, the difference value BC illustrated in FIG. 6(F) is further calculated, and when this difference value BC is also equal to or less than the threshold value, the filling pattern illustrated in FIG. 7(D) is selected.

The other combination of the difference value can similarly be derived due to the symmetry.

At step 132 (S132), the filling pattern selecting part 530 outputs the selected filling pattern and the block to the partial region replacing part 550.

The partial region replacing part 550 calculates the average pixel value by using some of the pixel values in the block in accordance with the filling pattern (FIGS. 7(B) to 7(D)) inputted from the filling pattern selecting part 530.

At step 134 (S134), the partial region replacing part 550 replaces some of the pixel values in the inputted block by the calculated average pixel value in accordance with the inputted filling pattern, and outputs the block whose pixel value is replaced to the hierarchical process controller 560.

At step 136 (S136), when all of the difference values (the difference AB, difference CD, difference AC, and difference BC) are greater than the threshold value, the filling pattern selecting part 530 selects the filling pattern illustrated in FIG. 7(E). The filling pattern in FIG. 7(E) is to inhibit the filling to the block.

When the filling pattern selecting part 530 selects the filling pattern of FIG. 7(E), it outputs this block and filling pattern to the partial region replacing part 550.

The partial region replacing part 550 outputs the inputted block as it is to the hierarchical process controller 560 in accordance with the filling pattern (inhibition of filling) inputted from the filling pattern selecting part 530.

As explained above, the image processing apparatus 2 according to the present exemplary embodiment may limit the range filled with the same pixel value in the block. Accordingly, the deterioration in image quality due to the filling is difficult to be noticeable.

Further, since the image processing apparatus 2 according to the present exemplary embodiment performs a process independently to each block, it enables parallel processing.

Further, the image processing apparatus 2 according to the present exemplary embodiment performs a process in a hierarchical manner to enlarge the size of the block adaptively. Therefore, for the edge region in the image, the region filled with the same pixel value is decreased since the difference value is great, and for the smooth region in the image, a wide region is filled with the same pixel value since the difference value is small. Specifically, the compression efficiency can be enhanced with the image quality at the edge portion retained.

MODIFIED EXAMPLE

Subsequently, a modified example of the above-mentioned exemplary embodiment will be explained.

In the above-mentioned exemplary embodiment, all pixels included in the input image are equivalently handled. However, the conversion of the pixel value for a specific pixel may be inhibited to protect the specific pixel according to the demand from the user.

For example, the image processing apparatus 2 may input, in addition to the input image, binary image data (the data in which the position of the specific pixel is "1" and the other image region is "0") indicating the position of the specific pixel that is the subject to protection. In this case, the filling pattern selecting part 530 (FIG. 3) specifies the specific pixel to be protected on the basis of the inputted binary image data, and when the specific pixel is included in the filling region in the filling pattern (the image region replaced by the average pixel value in FIG. 7), it inhibits the filling process.

When the specific pixel is included in the calculation of the difference value of FIGS. 6(B) to 6(F), the difference value evaluating part 520 (FIG. 3) always evaluates this difference value as being equal to or less than the threshold value.

Alternatively, when the difference value between non-specific pixels in the block of 2×2 is equal to or less than the threshold value, the pixel value of the non-specific pixel may be filled with the single pixel value. Further, when the pixel value of the non-specific pixel is filled with the single pixel value, the evaluation of the broader block may be executed even if the specific pixel is present. Doing this process makes it possible to fill the pixel value in the block of a great size, even if the specific pixel is present.

Although the above-mentioned exemplary embodiment is explained on the assumption that plural color component images composing a color image are processed independently, the filling process for plural color components may be made common.

In this case, the difference value evaluating part 520 (FIG. 3) calculates the difference values of FIGS. 6(B) to 6(F) for the block at the same position of the plural color component images, for example. The difference value evaluating part 520 defines the greatest difference value AB, among the difference values AB calculated at each of the plural color component images, as the difference value AB (i.e., the difference value AB common to the plural color component images) of this block. Similarly, it defines the greatest difference values CD, AC and BC as the common difference values.

The image processing program 5 in this modified example selects the filling pattern common to the plural color components by using the thus calculated common difference AB, difference CD, difference AC and difference BC, and executes the filling process for the block of each color component by using the selected common filling pattern.

Although the block size is enlarged by powers of 2, the block size may be fixed.

For example, the image processing apparatus 2 may take a block size of 2×2 for the whole image. In general, the whole image may be divided into blocks of N×N, and all of the pixels in the block may be replaced by the average of the block of N×N.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The exemplary embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus, comprising:
a block setting unit that sets a block of a plurality of blocks having a fixed size to inputted image data, the set block including a plurality of sub-blocks, with each sub-block including a pixel value;
a determining unit that determines whether or not at least two of the sub-blocks included in the set block are filled with a single pixel value, wherein
the determining unit comprises:
a difference value evaluating unit that calculates a difference value between each pair of the plurality of sub-blocks included in the set block pixel values, and evaluates the plurality of calculated difference values; and
a region determining unit that determines at least two of the sub-blocks, among the sub-blocks included in the set block, that should be filled with the single pixel value on the basis of a result of the evaluation for each pair of the plurality of sub-blocks by the difference value evaluating unit,
a pixel value replacing unit that replaces the sub-blocks included in the set block by the single pixel value according to a result of the determination by the determining unit, wherein the pixel value replacing unit replaces the image region determined by the region determining unit by the single pixel value; and a hierarchical process controller that instructs the block setting unit to set a broader block including a plurality of set blocks.

2. The image processing apparatus according to claim 1, wherein when the plurality of set blocks that are adjacent to each other are filled with a same pixel value, the hierarchical process controller gives an instruction for setting the broader block including these blocks.

3. The image processing apparatus according to claim 1, wherein the determining unit determines whether or not at least two sub-blocks included in the block are filled with a same pixel value on the basis of a difference between pixel values of the two sub-blocks included in the set block being less than a threshold amount.

4. The image processing apparatus according to claim 1, wherein the pixel value replacing unit comprises:
an image reducing unit that, when it is determined by the determining unit that all the sub-blocks included in the set block are to be filled with the single pixel value, reduces all the sub-blocks in the set block with a reduction ratio according to the fixed size of the set block;
an image expanding unit that expands the sub-blocks reduced by the image reducing unit with the single pixel value; and
the hierarchical process controller instructs the block setting unit to again set the set block as the broader block by using the sub-blocks reduced by the image reducing unit.

5. The image processing apparatus according to claim 1, further comprising:
an inhibition region specifying unit that specifies an inhibited image region in which replacement of a pixel value is inhibited,
wherein, when the inhibited image region is included in the set block, the determining unit determines whether a filling is carried out or not only on sub-blocks included in the set block not within the inhibited image region, and
when the set block includes the sub-blocks on which the determining unit determines filling is carried out and further includes the sub-blocks included in the inhibited image region specified by the inhibition region specifying unit, the pixel value replacing unit does not replace the pixel value for the sub-blocks included in the inhibited image region specified by the inhibition region specifying unit.

6. An image processing unit, comprising:
a block setting unit that sets a block of a plurality of blocks having a fixed size to inputted image data, the set block including a plurality of sub-blocks, with each sub-block including a pixel value;
an image reducing unit that reduces all the sub-blocks included in the set block with a reduction ratio according to the fixed size of the set block in accordance with a gradation change in the block set by the block setting unit;
a hierarchical process controller that instructs the block setting unit to again set the set block as a broader block by using the sub-blocks reduced by image reducing unit when the set blocks that have a same pixel value are adjacent to each other;
an image expanding unit that expands the sub-blocks reduced by the image reducing unit to an original size;
a determining unit including:
a difference value evaluating unit that calculates a difference value between each pair of the plurality of sub-blocks included in the set block pixel values, and evaluates the plurality of calculated difference values, and a region determining unit that determines a plurality of sub-blocks, among the sub-blocks included in the set block, that should be filled with a new pixel value on the basis of a result of the evaluation for each pair of the plurality of sub-blocks by the difference value evaluating unit, and
a pixel value replacing unit that replaces the image region determined by the region determining unit by the new pixel value.

7. An image processing method, comprising:
setting a block of a plurality of blocks having a fixed size to inputted image data, the set block including a plurality of sub-blocks, with each sub-block including a pixel value;
determining whether or not at least two of the sub-blocks included in the set block are filled with a single pixel value;
replacing at least one of the sub-blocks included in the block by a single pixel value according to a result of the determination;
when the set blocks that have a single pixel value are adjacent to each other, setting a broader block including the set blocks;
determining whether or not the set broader block is filled with a second single pixel value;
replacing at least one of the plurality of blocks included in the broader block by the second pixel value according to the result of the determination;
calculating a difference value between each pair of the plurality of sub-blocks included in the set block pixel values, and evaluating the plurality of calculated difference values to a difference value evaluating unit;
determining at least one of the sub-blocks, among the sub-blocks included in the set block, that should be filled with the single pixel value on the basis of a result of the evaluation for each pair of the plurality of sub-blocks by the difference value evaluating unit, and storing the determining in a region determining unit; and
replacing the image region determined by the region determining unit by the single pixel value,
wherein the above steps are performed by a processor.

8. A non-transitory computer readable medium storing a program causing a computer to execute a process comprising:
setting a block of a plurality of blocks having a fixed size to inputted image data, the set block including a plurality of sub-blocks, with each sub-block including a pixel value;
determining whether or not at least two of the sub-blocks included in the set block are filled with a single pixel value;
replacing at least one of the sub-blocks included in the block by the single pixel value according to a result of the determination;
giving an instruction for setting a broader block including each of the set blocks when the set blocks that have the single pixel value are adjacent to each other;
calculating a difference value between each pair of the plurality of sub-blocks included in the set block pixel values, and evaluating the plurality of calculated difference values to a difference value evaluating unit;
determining at least two of the sub-blocks, among the sub-blocks included in the set block, that should be filled with the single pixel value on the basis of a result of the evaluation for each pair of the plurality of sub-blocks by the difference value evaluating unit, and storing the determining in a region determining unit; and
replacing the image region determined by the region determining unit by the single pixel value.

* * * * *